United States Patent

Nabeiro et al.

(10) Patent No.: US 11,497,342 B2
(45) Date of Patent: Nov. 15, 2022

(54) BEVERAGE PREPARATION APPARATUS OF SIMPLIFIED ACTUATION AND PROCESS OF OPERATION OF SAID APPARATUS

(71) Applicant: NOVADELTA—COMÉRCIO E INDÚSTRIA DE CAFÉS S.A., Lisbon (PT)

(72) Inventors: Rui Miguel Nabeiro, Campo Maior (PT); Jesús Medina Mundt, Lisbon (PT)

(73) Assignee: NOVADELTA—COMÉRCIO E INDÚSTRIA DE CAFÉS S.A., Lisbon (PT)

( * ) Notice: Subject to any disclaimer, the term of this patent is extended or adjusted under 35 U.S.C. 154(b) by 607 days.

(21) Appl. No.: 16/494,599

(22) PCT Filed: Mar. 16, 2018

(86) PCT No.: PCT/PT2018/050011
§ 371 (c)(1),
(2) Date: Sep. 16, 2019

(87) PCT Pub. No.: WO2018/169427
PCT Pub. Date: Sep. 20, 2018

(65) Prior Publication Data
US 2020/0085229 A1    Mar. 19, 2020

(30) Foreign Application Priority Data
Mar. 17, 2017   (PT) .................................... 109977

(51) Int. Cl.
*A47J 31/36*    (2006.01)
*A47J 31/00*    (2006.01)
(Continued)

(52) U.S. Cl.
CPC ......... *A47J 31/3676* (2013.01); *A47J 31/005* (2013.01); *A47J 31/0668* (2013.01);
(Continued)

(58) Field of Classification Search
CPC ................ A47J 31/0668; A47J 31/0673; A47J 31/3623; A47J 31/3628; A47J 31/3633;
(Continued)

(56) References Cited

U.S. PATENT DOCUMENTS

| 4,725,714 A  * | 2/1988 | Naya ..................... A47J 31/52 |
|                |        | 392/467 |
| 8,146,485 B2 * | 4/2012 | Ozanne ................... A47J 31/36 |
|                |        | 99/283 |
| 2012/0000371 A1* | 1/2012 | Blanchino ........... A47J 31/3633 |
|                |        | 99/295 |

FOREIGN PATENT DOCUMENTS

| WO | 2005/002405 A2 | 1/2005 |
| WO | 2010/091872 A2 | 8/2010 |

(Continued)

OTHER PUBLICATIONS

International Search Report for PCT/PT2018/050011 dated Jul. 11, 2018 [PCT/ISA/210].
(Continued)

*Primary Examiner* — Reginald Alexander
(74) *Attorney, Agent, or Firm* — Sughrue Mion, PLLC

(57) ABSTRACT

The present invention discloses an apparatus (1) for preparing beverages, in particular aromatic beverages such as espresso coffee and similar, from the brewing of a single portion (2) of a respective edible substance, whereby said apparatus (1) comprises a portion collection disposition (3) adapted for collecting said single portion (2) of edible substance and a beverage discharge (5), and is advantageously configured so as to simplify the actuation of respective portion collection disposition (3), and to be operated in (Continued)

portable manner, for example in the form of a compact apparatus, recipient, or transported, for example in the form of backpack, or trolley, along a given distance autonomously relative to external energy sources.

The present invention further discloses a process for distribution of beverages by means of a beverage preparation apparatus.

15 Claims, 3 Drawing Sheets

(51) Int. Cl.
 *A47J 31/40* (2006.01)
 *A47J 31/44* (2006.01)
 *A47J 31/06* (2006.01)

(52) U.S. Cl.
 CPC ......... *A47J 31/3633* (2013.01); *A47J 31/407* (2013.01); *A47J 31/4403* (2013.01); *A47J 31/3623* (2013.01)

(58) Field of Classification Search
 CPC .... A47J 31/3676; A47J 31/368; A47J 31/369; A47J 31/3695
 USPC .......................................... 99/284, 295, 307
 See application file for complete search history.

(56) References Cited

FOREIGN PATENT DOCUMENTS

| WO | 2011/067264 A1 | 6/2011 | |
|---|---|---|---|
| WO | 2015/173125 A1 | 11/2015 | |
| WO | WO-2016020770 A1 * | 2/2016 | ......... A47J 31/3638 |

OTHER PUBLICATIONS

Written Opinion for PCT/PT2018/050011 dated Jul. 11, 2018 [PCT/ISA/237].

* cited by examiner

US 11,497,342 B2

BEVERAGE PREPARATION APPARATUS OF SIMPLIFIED ACTUATION AND PROCESS OF OPERATION OF SAID APPARATUS

This application is a National Stage of International Application No. PCT/PT2018/050011, filed on Mar. 16, 2018, which claims priority from Portuguese Patent Application No. 109977, filed on Mar. 17, 2017, the entire contents of each of which are herein incorporated by reference in their entireties.

FIELD OF THE INVENTION

The present invention refers to the field of apparatus for preparing beverages by means of injection of a pressurized fluid flow upon a single portion of respective edible substance collected in a respective portion collection device.

The present invention further refers to a process of operation of an apparatus for preparing beverages do the aforementioned type.

BACKGROUND OF THE INVENTION

The prior art presents several solutions relating to brewing devices adapted for collecting single portions of a beverage precursor substance.

The documents EP 2497395 B1 and WO 2012/158055 A1 registered by the author, disclose brewing devices comprised in beverage preparation apparatus of the type of the present invention. These devices present a closing disposition including a closing element provided in the manner of a lever so that can move a collection disposition adapted for collecting a single portion, in a swiveling movement around a reference swivel axis, between an open position where can collect a single portion, and a closed position, and vice-versa.

The document EP 1781153 B1 discloses a beverage preparation device whereby the closing disposition is provided so that when in a closed position, a free edge is oriented to the posterior zone of the apparatus. In this case the closing disposition is provided as a piece independent from the collection disposition that is provided so that can be driven in a translation movement. Moreover, the closing disposition is provided so that does not move together with the beverage discharge disposition.

The prior art further presents solutions relating to portable systems of beverage distribution.

The document EP 0366444 B1 discloses a system of distribution of cold and hot beverages, configured with a general shape of a backpack. Said system comprises fluid pressurization means provided in the backpack-like part and connected by means of a pipe to respective beverage discharge means. In particular, said system presents pumping means that are manually operated, whereby a respective handle is mounted adjacent to the edge of discharge of cups dispensing means. Said system further presents a manual discharge disposition provided distanced from said pumping actuation handle.

The documents WO 95/11853 and EP 1699732 B1 disclose other beverage distribution systems of the same type.

The document WO 2005/002405 A2 discloses an espresso machine that includes a single portion collection device associated in a joint disposition with an actuation element, of the lever type, of said collection device. In this case, the coffee machine and said actuation element do not present a compact form, adapted so that can be handheld. Moreover, the actuation element is configured so that can be actuated from a front position in relation to said espresso coffee machine. The document 2010/091872 A2 discloses a pre-packaged portion of grind coffee and espresso coffee machine for using said pre-packed portion. Also in this case, the apparatus is not configured so that can be handheld, and the actuation element does not provide the advantages of ergonomic use disclosed by the present invention.

GENERAL DESCRIPTION OF THE INVENTION

The objective of the present invention is to provide a beverage preparation apparatus including for example espresso type coffee, and other aromatic beverages such as tea and similar, by means of mixture of a pressurized fluid flow with a single portion of edible substance that is supplied, for example inside of a capsule, to a collection disposition of single portion, and that said apparatus presents a simple and ergonomic construction that simplifies the actuation of said collection disposition of single portion, in particular adapted so that said apparatus is portable and, preferentially, can be held and operated with a same hand, in the form of compact apparatus, for example of the recipient type, or transported, for example in the form of backpack, or trolley, along a given path with autonomy relative to external energy sources.

In particular, it is objective of the present invention to provide an apparatus that presents a particularly compact form, adapted for being handheld, and so that at least the opening of the single portion collection disposition can be driven by the same hand that holds the apparatus.

This objective is achieved according to the present invention by means of a beverage preparation apparatus according to claim 1. Preferred embodiments are disclosed on dependent claims.

It is preferred when the beverage preparation apparatus is adapted so that can operate in portable conditions, in particular in what refers to the configuration of a first and second support casing provided remote and in fluid connection, whereby said first support casing comprises the portion collection disposition and said support casing comprises a fluid supply source.

It is preferred when said fluid supply source is provided in a remote second support structure that is provided in fluid communication with said first support structure and said portion collection disposition by means of at least one first fluid line, preferentially also of a second fluid line.

It is preferred when said fluid supply source comprises:
fluid storage means adapted so that provide storage of a given fluid quantity, preferentially fluid storage means adapted so as to maintain a fluid temperature between 60 and 100° C. during a previously defined operation period;
optionally, fluid heating means adapted so that can supply a fluid flow at a temperature comprised between 60 and 100° C., preferentially between 80 e 90° C.;
fluid pressurization means adapted so that can supply a fluid flow at a pressure comprised between 1 and 20 bar, preferentially between 5 and 15 bar,
fluid connection means adapted so as to provide fluid connection between said fluid supply components, and adapted for connection with the first fluid line connected with means for injection of pressurized fluid into the portion collection disposition.

It is preferred when said fluid supply source is provided with energy autonomy so that said beverage preparation device can be operated without a function energy connection to an external source and, preferentially, can be transported along a given distance in operating conditions in autonomous manner relative to external energy sources, whereby said fluid supply source preferentially comprises energy storage means and said fluid pressurization means are preferentially provided as a compressed gas recipient.

It is preferred when said fluid supply source further presents transport, adapted so as to provide their transport on the back of an individual, such as for example in manner of a backpack, or to provide its displacement by an individual, such as for example in manner of a vehicle.

Another objective of the present invention is to provide a process of preparing beverages that provides better conditions of ergonomic use and portability.

This objective is solved by means of a process according to claim 13.

Preferred embodiments are disclosed on the dependent claims.

It is preferred when the process according to the invention includes a step of actuation of start of supply of a pressurized fluid flow to said portion collection disposition, whereby said step of actuation does not include the supply of energy from an energy source external to said apparatus.

It is preferred when the step of start of supply of a pressurized fluid flow to said portion collection disposition includes the actuation of an actuation device, whereby said actuation device is preferentially provided with a button arranged in a region of a first support structure below of said beverage discharge disposition.

It is preferred when said step of providing a beverage preparation apparatus includes handholding said apparatus with a hand.

It is preferred when said step of providing a beverage preparation apparatus includes holding a first support structure of said apparatus with a hand, and a second support structure of said apparatus is not held with a hand but is provided portable, or associated with transport means.

DESCRIPTION OF THE FIGURES

The invention shall hereinafter be explained in greater detail based upon preferred embodiments and the attached Figures.

The Figures show, in simplified schematic representations.

DETAILED DESCRIPTION OF THE INVENTION

Figure 1:
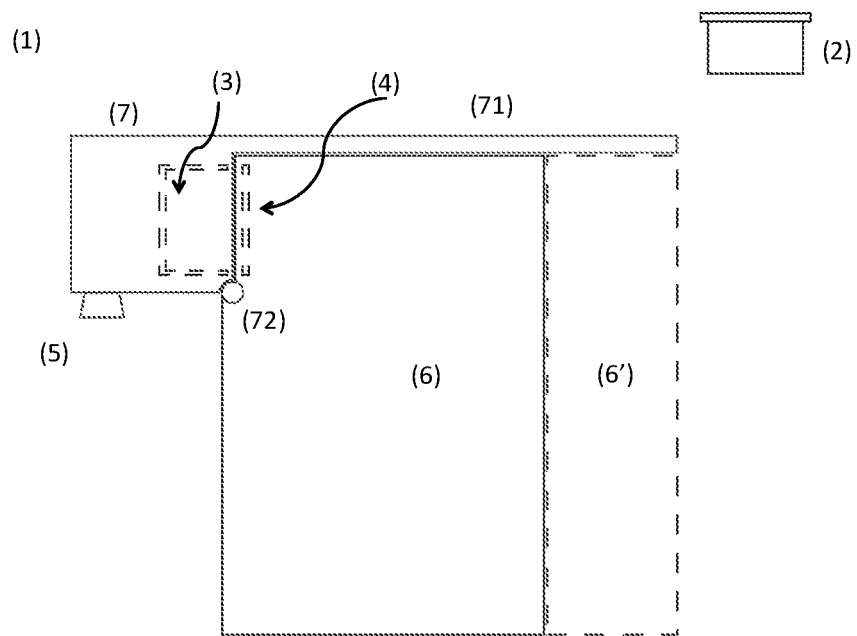
FIG. 1: side-view of a first embodiment of an apparatus (1) for preparing beverages according to the present invention, in a closed position.
Figure 2:
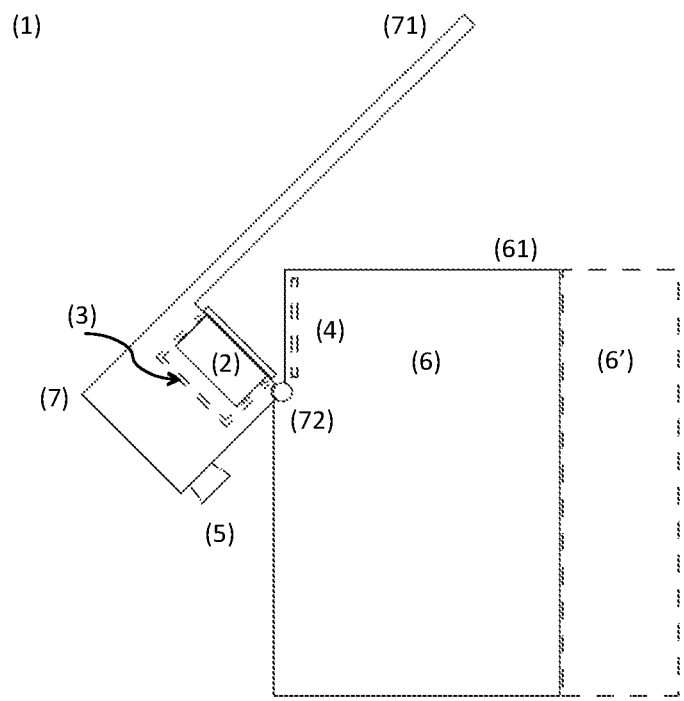
FIG. 2: side-view of a first embodiment of an apparatus (1) for preparing beverages according to the present invention, in an open position.
Figure 3:
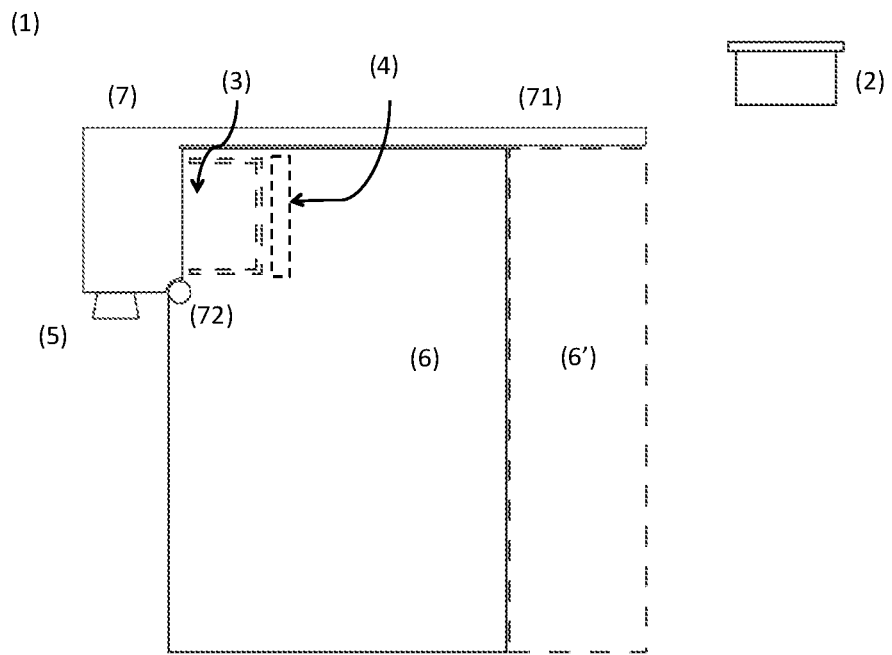
FIG. 3: side-view of a second embodiment of an apparatus (1) for preparing beverages according to the present invention, in a closed position.
Figure 4:
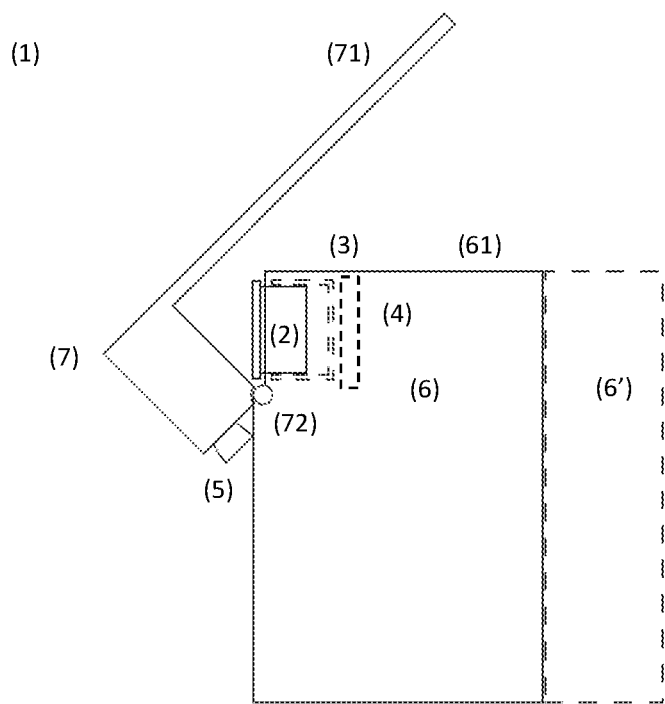
FIG. 4: side-view of a second embodiment of an apparatus (1) for preparing beverages according to the present invention, in an open position.

As represented in both embodiments (FIGS. 1 and 2, and FIGS. 3 and 4, respectively), the beverage preparation apparatus (1) according to the present invention comprises a portion collection disposition (3) adapted for collection of said single portion (2) when in a open position, and disposed downstream of a fluid injection disposition (4) and upstream of a beverage discharge disposition (5), a first support structure (6) provided stationary, presenting a posterior region adapted for connection to said fluid supply source (11), and a front region adapted for supporting said portion collection disposition (3).

It is preferred when said portion collection disposition (3) presents a cup-like or similar general shape, whereby the opening and interior surface of cup is adapted for collecting single portions (2) with a sidewall adjusted to the shape thereof. Moreover, said portion collection disposition (3), when in a respective closed position, is confined upstream by a stationary top wall that presents said fluid injection disposition (4) that is provided in fluid connection with said fluid supply source (11) upstream, and is confined downstream by a base wall that presents beverage discharge means provided in fluid connection with said beverage discharge disposition (5).

Moreover, said apparatus (1) further comprises a closing disposition (7) adapted so that provides the movement of opening and closing of said portion collection disposition (3) by means of a closing element (71) presenting an elongated form with a free edge and provided so that can be swiveled around a reference swiveling axis (72), between an open position where releases passage for introduction of said single portion (2) in said portion collection disposition (3), and a closed position where provides close of said portion collection disposition (3) in liquid-tight manner.

According to an inventive aspect of said apparatus (1), said closing element (71) is provided so that said free edge is oriented backwards and can be moved around a reference swivel axis (72) disposed in a frontal region and below the top region of said first support structure (6). It thus advantageously results that said closing disposition (7) can be opened by means of a movement corresponding to swiveling of said closing element (71) from a substantially horizontal and backwards-oriented direction, to a substantially vertical direction and oriented upwards on a frontal region of said apparatus (1), corresponding to the open position, and can be closed by means of a reverse movement.

The actuation of said closing disposition (7) therefore results in a swivel movement of the closing element (71) from a substantially horizontal direction and backwards-oriented free edge, in the top region of said apparatus (1), corresponding to the closed position, to a substantially vertical direction and upwards-oriented free edge, at a frontal region of said apparatus (1), and vice-versa.

Moreover, said reference swivel axis (72) is disposed below a top region of said first support structure (6), so that said closing element (71) can be swiveled around said reference swivel axis (72) from a top region of said first support structure (6) to a frontal region thereof.

It is further preferred when said reference swivel axis (72) is disposed below the level of said portion collection disposition (3) of said first support structure (6), so that the free edge of said closing element (71) can be swiveled in an angle smaller than 100°, preferentially of approximately 90°, around said reference swivel axis (72), from a posterior region of said support structure (6) to a frontal region thereof.

As represented, it is preferred when said closing element (71) is configured so that, when in the closed position, develops along at least most part, preferentially the entire top region of envelope casing (61) of said first support structure (6).

According to an inventive aspect, said closing disposition (7) is further adapted so that can only carry out a swivel movement, and configured so that at least one of said portion collection disposition (3) and said beverage discharge disposition (4), is moved between respective initial and final positions together with the swiveling movement of said closing element (71).

It is herewith provided a compact construction of the ensemble formed by the closing disposition (7), portion collection disposition (3) and discharge disposition (5), as well as an ergonomic operative disposition of these components.

In particular, in the case of a first embodiment of apparatus (1) according to the present invention (FIGS. 1 and 2), said closing element (71) is provided in a joint construction, without movement transmission elements, with said portion collection disposition (3) and beverage discharge disposition (4).

It is preferred when said closing element (71) is provided in a single piece with said portion collection disposition (3), so that when said portion collection disposition (3) is in an open position, the respective opening for introduction of single portion (2) is oriented substantially upwards.

Alternatively, as in the case of the second embodiment of apparatus (1) according to the present invention (FIGS. 3 and 4), said closing element (71) can be provided in a single piece with said beverage discharge disposition (4), whereby said reference swivel axis (72) is disposed in a upstream region of said beverage discharge disposition (4).

It is further preferred when said first support structure (6) presents a respective envelope casing (61), whereby said closing element (71) is preferentially configured so that, when in the closed position, results adjacent to said envelope casing (61) or in the continuation of the exterior surface thereof and projecting beyond the edge of respective posterior region.

It is particularly preferred when said first support structure (6) presents a respective envelope casing (61) adapted so that can be held by a hand, preferentially configured in form of bottle, recipient, handle or similar.

In the case of the represented embodiments, the apparatus (1) presents a second support structure (6') adapted at least for fluid storage and provided in fluid connection with said first support structure (6).

Figure 5:
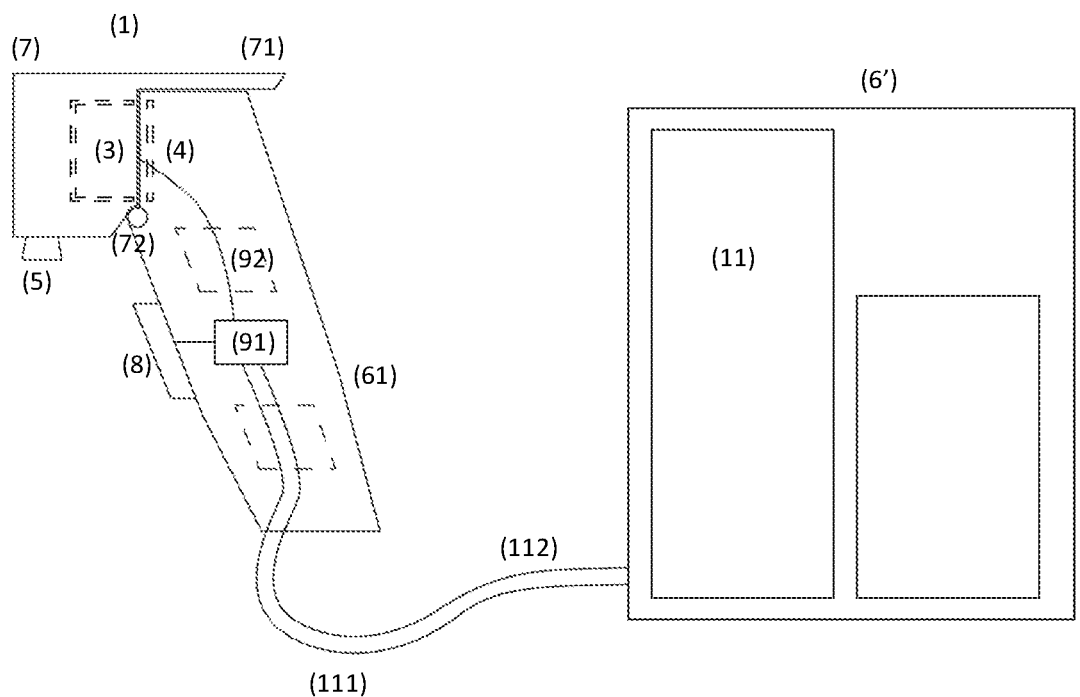
FIG. 5: side-view of another embodiment of an apparatus (1) for preparing beverages according to the present invention, according to FIGS. 1 and 2, including a remote fluid supply source.
Figure 6:
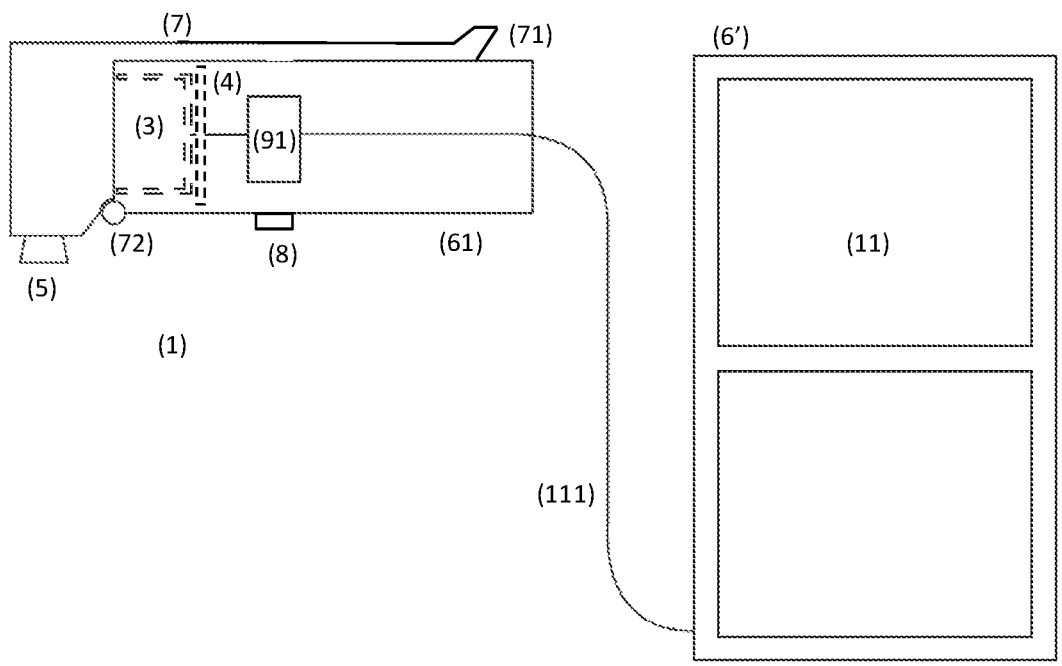
FIG. 6: side-view of another embodiment of an apparatus (1) for preparing beverages according to the present invention, according to FIGS. 3 and 4, including a remote fluid supply source.

FIGS. 5 and 6 represent embodiments corresponding to those represents in the previous figures, and wherein the apparatus (1) includes a first support structure (6) presenting an envelope casing (61) configured so that can be handheld, and further presents a second support structure (6') that presents a fluid supply source (11) provided in fluid connection with said first support structure (6) by means of a first fluid connection (111).

Said fluid supply source (11) preferentially comprises fluid storage means, preferentially thermally insulated storage a fluid previously provide at a temperature bigger than 80° C.

Said fluid supply source (11) further comprises fluid pressurization means, preferentially without required energy supply from an external energy source. It is preferred when said fluid pressurization means are provided as a compressed gas, and adapted so that can supply a pressurized fluid at a pressure bigger than 5 bar.

As can be observed in the embodiments represented in FIGS. 5 and 6, according to a preferred embodiment, the apparatus (1) further presents a distribution valve (91) disposed inside of said first support structure (6), between a first fluid connection (111) upstream and the fluid injection means (4) into said portion collection disposition (5), whereby said distribution valve (91) can be actuated by means of applying pressure upon an actuation element (8), for example with the pointing finger of the same hand holding said envelop casing (61), so that release the fluid passageway while said actuation element (8) remains actuated.

It is preferred when there is further provided a residues collection disposition (92), inside of said first support structure (6)—see FIG. 5), adapted so that can collect liquid residues from the interior of said portion collection disposition (5), whereby said residues collection disposition (92) is provided in fluid connection downstream with a second fluid line (112) configured so that discharges outwards of said envelope casing (61) of said first support structure (6).

It is preferred when said second support structure (6'), comprising said fluid supply source (11), further presents transport means, adapted so as to provide respective transport on the back of an individual, for example in the manner of a backpack, or to provide its displacement by an individual, such as for example in manner of a vehicle.

Lisbon, 16 Mar. 2018

The invention claimed is:

1. A beverage preparation apparatus (1) adapted for preparing beverages by means of supply of a pressurized fluid by a fluid supply source (11) so that the fluid flows through a single portion (2) of edible substance precursor of a beverage, said apparatus (1) comprising:

a portion collection disposition (3) arranged downstream of a fluid injection disposition (4) provided stationary, and upstream of a beverage discharge disposition (5), and adapted for collection of said single portion (2) when in an open position, and for beverage discharge into said beverage discharge disposition (5) when in a closed position, a first support structure (6) provided stationary, presenting a first region, for example a posterior region or a base region, adapted for connection to said fluid supply source (11), and a second region, for example a frontal region, adapted for supporting said portion collection disposition (3) and a top region; and a closing disposition (7) comprising a closing element (71) presenting an elongated form with a free distal end and provided to be swivelled around a reference swivel axis (72), between an open position in which there is a passage for introduction of said single portion (2) into said portion collection disposition (3), and a closed position in which provides closing of said portion collection disposition (3) is closed in a liquid-tight manner, wherein the reference swivel axis (72) is disposed in the frontal region and below the top region of said first support structure (6), wherein said closing element (71) is provided so that said free distal end is oriented backwards and that can be moved around reference swivel axis (72), so that said closing disposition (7) can be opened by a corresponding swivelling movement of said closing element (71) from a substantially horizontal direction and oriented backwards with respect to said frontal region, corresponding to the closed position, to a substantially vertical direction and oriented upwards in with respect to said frontal region of said first support structure (6), corresponding to the open position, and can be closed by means of a reverse movement.

2. The apparatus according to claim 1, wherein said portion collection disposition (3) presents a general cup-shape or similar shape, with collection opening and interior collection space adapted for collection of single portions (2) in adjusted manner to the shape and dimension thereof, and
wherein said collection portion disposition (3) is adapted so that when in a closed position, it is confined upstream by a stationary top wall that presents said fluid injection disposition (4) that is provided upstream of and in fluid connection with said fluid supply source (11), and is confined downstream by a base wall that presents beverage discharge means provided in fluid connection with said beverage discharge disposition (5).

3. The apparatus according to claim 1, wherein said reference swivel axis (72) is arranged below the top region of said first support structure (6), so that said closing element (71) can be swivelled around said reference swivel axis (72) from the top region of said first support structure (6) to the frontal region thereof.

4. The apparatus according to claim 1, wherein said reference swivel axis (72) is arranged below a level of said portion collection disposition (3) in said first support structure (6), so that the free distal end of said closing element (71) can be swivelled by an angle smaller than 100°, around said reference swivel axis (72), from the posterior region of said first support structure (6) to the frontal region thereof.

5. The apparatus according to claim 1, wherein said closing element (7) comprises at least one of the following components:
said portion collection disposition (3),
said beverage discharge disposition (5),
so that at least one thereof is moved together with said closing element (71) between respective initial and final positions.

6. The apparatus according to claim 1, wherein said closing element (71) is provided in a joint construction, without movement transmission elements, preferentially in a single piece, with said portion collection disposition (3), so that if said portion collection disposition (3) is in an open position, the respective opening for collection of single portion (2) is oriented substantially upwards.

7. The apparatus according to claim 1, wherein said closing element (71) is provided in a joint disposition, without movement transmission elements, preferentially in a single piece, with said beverage discharge disposition (5), whereby said reference swivel axis (72) is disposed on a region upstream of said beverage discharge disposition (5), or at a similar height of said beverage discharge disposition (5).

8. The apparatus according to claim 1, wherein said first support structure (6) presents an envelope casing (61), whereby said closing element (71) is configured so that, in the closed position, it is adjacent to the top region of said envelope casing (61) or at least partially embedded therein, and
wherein said closing element (71) is configured so that, in the closed position, said closing element extends along at least most part of the entire top region of the envelope casing (61) of said first support structure (6), whereby, when the free distal end of said closing element (71) projects in at least one of above and beyond the top region of envelope casing (61), said free edge provides a detached surface for manual actuation thereof.

9. The apparatus according to claim 1, wherein said apparatus (1) further comprises a second support structure (6') adapted at least for fluid storage and provided in fluid connection with said first support structure (6).

10. The apparatus according to claim 1, wherein said fluid supply source (11) is provided in a second support structure (6') that is remote and can be put in fluid communication with said first support structure and said portion collection disposition (3) by means of first and second fluid lines (111, 112).

11. A process for distribution of a beverage, characterized in that includes the steps:
providing a beverage preparation apparatus (1), in particular an apparatus (1) according to claim 1:
actuating the closing disposition (7) so that the portion collection disposition (3) evolves from a closed position to an opened position;
introducing a single portion (2) in the portion collection disposition (3);
actuating a closed disposition (7) so that the portion collection disposition (3) evolves from an open to a closed position;
actuating an actuation device so that there is initiated the injection of pressurized fluid in said portion collection disposition (3); and
discharging a beverage through the discharge disposition (5);
whereby the actuation of said closing disposition (7) results in a swivelling movement of the closing element (71) from a substantially horizontal position and backwards oriented free distal end, on the top region of said apparatus (1), corresponding to the closed position, to a substantially vertical position and upwards oriented free distal end, on a frontal region of said apparatus (1), and vice-versa.

12. The process according to claim 11,
wherein said swivel movement of said portion collection disposition (3) unfolds simultaneously, preferentially in solidary manner and without intercalary movement transmission means, with the drive of said discharge disposition (5).

13. The process according to claim 11, wherein said step of actuation of an actuation device to initiate the injection of pressurized fluid in said portion collection disposition (3), does not require energy supply from a source external to said apparatus (1).

14. A beverage preparation apparatus (1) adapted for preparing beverages by means of supply of a pressurized fluid by a fluid supply source (11) so that the fluid flows through a single portion (2) of edible substance precursor of a beverage,
said apparatus (1) comprising:
a portion collection disposition (3) arranged downstream of a fluid injection disposition (4) provided stationary, and upstream of a beverage discharge disposition (5), and adapted for collection of said single portion (2) in an open position, and for beverage discharge into said beverage discharge disposition (5) in a closed position,
a first support structure (6) provided stationary, presenting a first region, for example a posterior region or a base region, adapted for connection to said fluid supply source (11), and a second region, for example a frontal region, adapted for supporting said portion collection disposition (3); and
a closing disposition (7) comprising a closing element (71) presenting an elongated form with a free edge and provided to be swivelled around a reference swivel axis (72), between an open position in which releases passage for introduction of said single portion (2) into said portion collection disposition (3), and a closed position in which closing of said portion collection disposition (3) is provided in a liquid-tight manner, wherein said closing element (71) is provided so that said respective free edge is oriented backwards and said closing element can be moved around a reference swivel axis (72) disposed in the frontal region and below the top region of said first support structure (6), so that said closing disposition (7) can be opened by a corresponding swivelling movement of said closing element (71) from a substantially horizontal direction and oriented backwards, corresponding to the closed position, to a substantially vertical direction and oriented upwards in the frontal region of said first support structure (6), corresponding to the open position, and can be closed by means of a reverse movement, wherein said first support structure (6) comprises a distribution valve (91) provided between a first fluid connection (111) upstream and the fluid injection means (4) to said portion collection disposition (3), whereby said distribution valve (91) can be actuated by means of pressure upon an actuation element (8), for example by means of the pointing finger of the hand holding said envelope casing (61), so that the passage of fluid is released while said actuation element (8) is actuated, and wherein said first support structure (6) presents an envelope casing (61) adapted to be handheld.

15. A beverage preparation apparatus (1) adapted for preparing beverages by means of supply of a pressurized fluid by a fluid supply source (11) so that the fluid flows through a single portion (2) of edible substance precursor of a beverage, said apparatus (1) comprising:

a portion collection disposition (3) arranged downstream of a fluid injection disposition (4) provided stationary, and upstream of a beverage discharge disposition (5), and adapted for collection of said single portion (2) in an open position, and for beverage discharge into said beverage discharge disposition (5) in a closed position, a first support structure (6) provided stationary, presenting a first region, for example a posterior region or a base region, adapted for connection to said fluid supply source (11), and a second region, for example a frontal region, adapted for supporting said portion collection disposition (3); and a closing disposition (7) comprising a closing element (71) presenting an elongated form with a free edge and provided to be swivelled around a reference swivel axis (72), between an open position in which releases passage for introduction of said single portion (2) into said portion collection disposition (3), and a closed position in which closing of said portion collection disposition (3) is provided in a liquid-tight manner, wherein said closing element (71) is provided so that said respective free edge is oriented backwards and said closing element can be moved around a reference swivel axis (72) disposed in the frontal region and below the top region of said first support structure (6), so that said closing disposition (7) can be opened by a corresponding swivelling movement of said closing element (71) from a substantially horizontal direction and oriented backwards, corresponding to the closed position, to a substantially vertical direction and oriented upwards in the frontal region of said first support structure (6), corresponding to the open position, and can be closed by means of a reverse movement, and wherein said first support structure (6) comprises a residues collection disposition (92) adapted to collect liquid residues from inside of said portion collection disposition (3), whereby said residues collection disposition (92) is provided in fluid connection downstream with a second fluid connection (112) that discharges out of said envelope casing (61) of said first support structure (6).

\* \* \* \* \*